US012607772B2

(12) United States Patent (10) Patent No.: US 12,607,772 B2

Ding et al. (45) Date of Patent: Apr. 21, 2026

(54) SNOW / WATER LEVEL DETECTION WITH DISTRIBUTED ACOUSTIC SENSING INTEGRATED ULTRASONIC DEVICE

(71) Applicant: NEC Laboratories America, Inc., Princeton, NJ (US)

(72) Inventors: Yangmin Ding, East Brunswick, NJ (US); YueTing Wang, West Windsor, NJ (US); Yue Tian, Princeton, NJ (US); Sarper Ozharar, Pennington, NJ (US)

(73) Assignee: NEC Corporation, Tokyo (JP)

( * ) Notice: Subject to any disclaimer, the term of this patent is extended or adjusted under 35 U.S.C. 154(b) by 577 days.

(21) Appl. No.: 17/969,673

(22) Filed: Oct. 19, 2022

(65) Prior Publication Data

US 2023/0129510 A1 Apr. 27, 2023

Related U.S. Application Data

(60) Provisional application No. 63/270,659, filed on Oct. 22, 2021.

(51) Int. Cl.
| | |
|---|---|
| *G01W 1/14* | (2006.01) |
| *G01D 5/26* | (2006.01) |
| *G01D 5/353* | (2006.01) |
| *G01H 9/00* | (2006.01) |
| *G01W 1/18* | (2006.01) |

(52) U.S. Cl.
CPC .............. *G01W 1/14* (2013.01); *G01H 9/004* (2013.01); *G01W 1/18* (2013.01); *G01D 5/268* (2013.01); *G01D 5/35358* (2013.01); *G01D 5/35361* (2013.01)

(58) Field of Classification Search
CPC .......... G01W 1/14; G01W 1/18; G01H 9/004; G01D 5/35361; G01D 5/35358; G01D 5/268
See application file for complete search history.

(56) References Cited

U.S. PATENT DOCUMENTS

| | | | | |
|---|---|---|---|---|
| 2013/0025375 A1* | 1/2013 | Goldner | ................. | G01V 1/226 |
| | | | | 250/227.14 |
| 2017/0045410 A1* | 2/2017 | Crickmore | ............. | G01K 11/32 |
| 2018/0180451 A1* | 6/2018 | Wissem | ............. | G01D 5/35387 |

OTHER PUBLICATIONS

Lin et al. ("Fiber-Optic Perimeter Intrusion Detection by Employing a Fiber Laser Cavity in Each Defensed Zone," in IEEE Sensors Journal, vol. 18, No. 20, pp. 8352-8360, 15 Oct. 15, 2018, doi: 10.1109/JSEN.2018.2866223) (Year: 2018).*

(Continued)

*Primary Examiner* — Lisa M Caputo
*Assistant Examiner* — Christian T Bryant
(74) *Attorney, Agent, or Firm* — Joseph Kolodka

(57) ABSTRACT

Aspects of the present disclosure describe distributed fiber optic sensing/distributed acoustic sensing (DFOS/DAS) systems, methods, and structures that advantageously provide rainfall intensity measurements along an entire length of a fiber optic sensor. using existing telecommunications optical fiber—which may be part of a multi-fiber, fiber optic cable—that may simultaneously carry live telecommunications traffic. The DFOS/DAS fiber optic sensing is used to obtain vibration and/or sound data from which rainfall intensity measurements may be made along the entire length of the DFOS/DAS fiber optic sensor.

9 Claims, 4 Drawing Sheets

(56) References Cited

OTHER PUBLICATIONS

Schenato (A Review of Distributed Fibre Optic Sensors for Geo-Hydrological Applications. Appl. Sci. 2017, 7, 896. https://doi.org/10.3390/app7090896) (Year: 2017).*

Wang (Fiber Loop Ringdown a a Time-Domain Sensing Technique for Multi-Function Fiber Optic Sensor Platforms: Current Status and Design Perspectives. Sensors 2009, 9, 7595-7621. https://doi.org/10.3390/s91007595) (Year: 2009).*

* cited by examiner

SNOW / WATER LEVEL DETECTION WITH DISTRIBUTED ACOUSTIC SENSING INTEGRATED ULTRASONIC DEVICE

CROSS REFERENCE

This application claims the benefit of U.S. Provisional Patent Application Ser. No. 63/270,659 filed 22 Oct. 2021, the entire contents of which being incorporated by reference as if set forth at length herein.

TECHNICAL FIELD

This disclosure relates generally to distributed fiber optic sensing (DFOS) systems, methods, and structures. More particularly, it pertains to rainfall intensity estimation using distributed acoustic sensing (DAS).

BACKGROUND

An historical and statistical evaluation of rainfall data are important considerations in water resource planning and management including the construction of sewerage and storm systems, as well as the determination of the discharge capacity of drainage channels and pumping stations. More particularly, rainfall data plays a significant role in flood control, which reduces the loss of life and property.

As will be appreciated, rainfall intensity varies both over time and location, which makes it very difficult to conclusively measure. Traditionally, rainfall intensity is measured in one of two ways namely, collecting rainwater through a standard rain gauge over a period of time measuring the volume/height of the collected rainwater (inches, mm, etc.) as a function of rain intensity. Another, more sophisticated method, involves measuring absorption of mm-wave and microwave signals due to rainfall producing a rainfall intensity measurement in—for example—mm/hr.

As noted however, such methods only provide measurements of rainfall at a single location, from which it is generally not possible to determine rain intensity in surrounding, unmeasured areas.

SUMMARY

An advance in the art is made according to aspects of the present disclosure directed to distributed fiber optic sensing/distributed acoustic sensing (DFOS/DAS) systems, methods, and structures that advantageously provide rainfall intensity measurements along an entire length of a fiber optic sensor.

In sharp contrast to the prior art, systems and methods according to aspects of the present disclosure provide such rainfall intensity measurements using existing telecommunications optical fiber—which may be part of a multi-fiber, fiber optic cable—that may simultaneously carry live telecommunications traffic.

According to an aspect of the present disclosure, DFOS/DAS fiber optic sensing is used to obtain vibration or sound data from which rainfall intensity measurements may be made along the entire length of the DFOS/DAS fiber optic sensor.

BRIEF DESCRIPTION OF THE DRAWING

A more complete understanding of the present disclosure may be realized by reference to the accompanying drawing in which.

DESCRIPTION

Figure 1A:
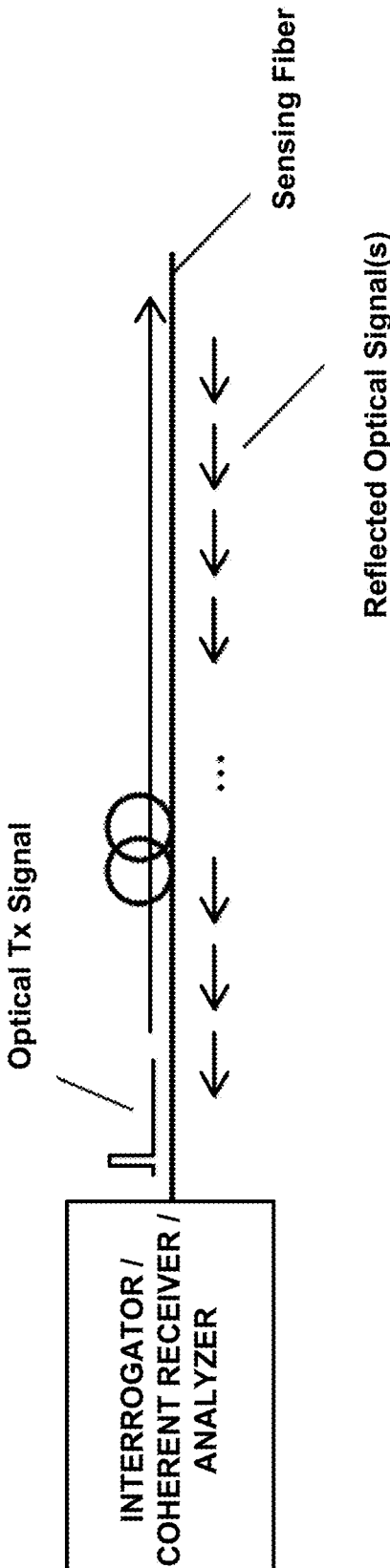
FIG. 1(A) is a schematic diagram illustrating a DFOS system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

Figure 1B:
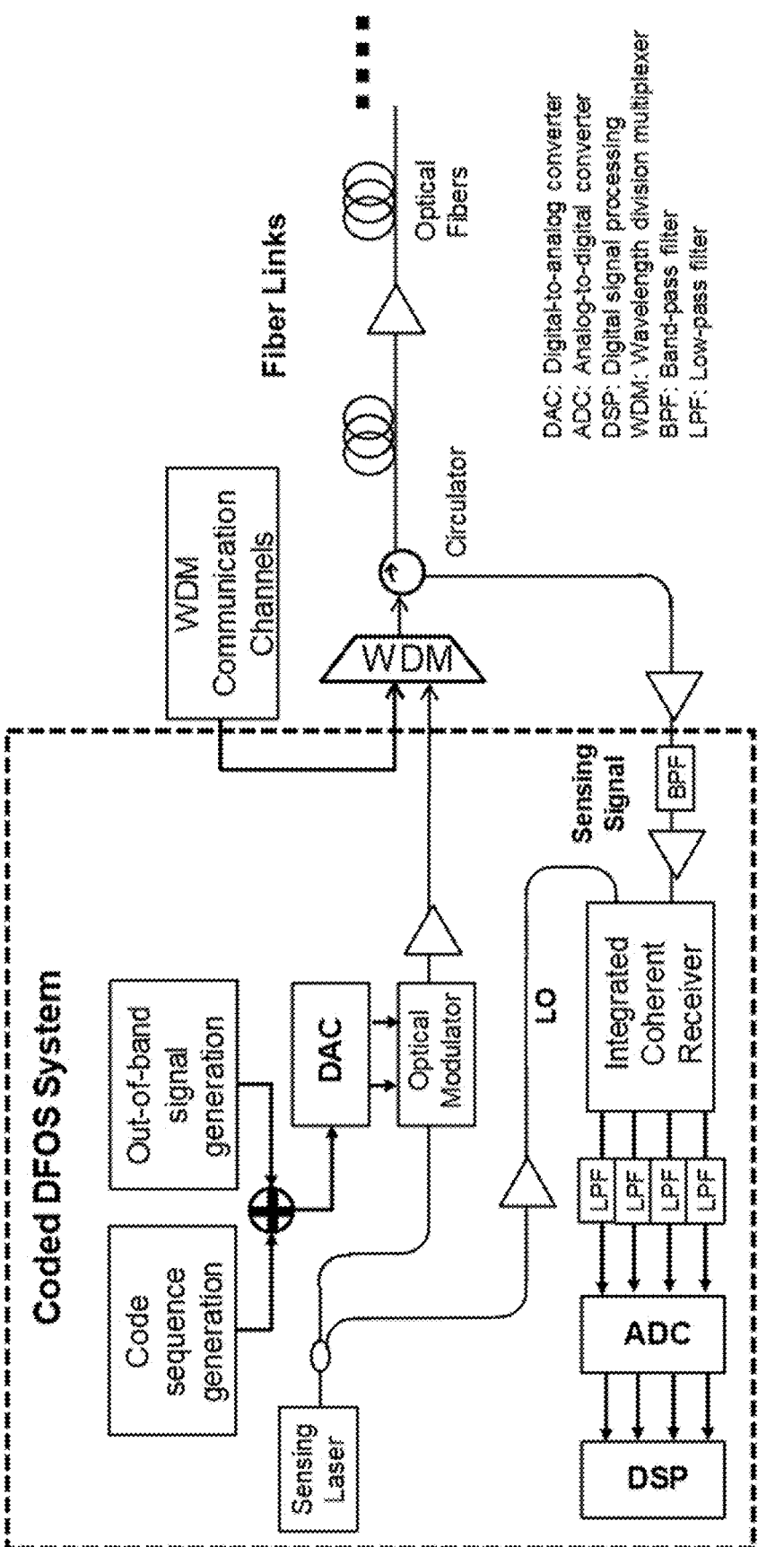
FIG. 1(B) is a schematic diagram illustrating a coded constant-amplitude DFOS system with out-of-band signal generation according to aspects of the present disclosure.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 1(B).

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest in integrating communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and any changes in the response are then identified and interpreted for sensor readouts.

With continued reference to the figure, since the coded interrogation sequence is generated digitally, the out-ofband signal is also generated digitally, and then combined with the code sequence before waveforms are created by the DAC. When generated together digitally, the out-of-band signal will only be generated outside the time period of the code sequence, so when added together, the combined waveform will have a constant amplitude.

As those skilled in the art will understand and appreciate, DFOS/DAS systems have been shown to detect, record and listen to acoustic vibrations in the audible frequency range. However, one of the limiting factors for sensitivity is the physical layout of the fiber optic cable used as the sensor.

For outdoor applications, telecom grade thick fiber cables are not physically very responsive to low amplitude, vibrations in the audible range. Consequently, acoustic signal quality greatly depends on the fiber type, layout and how the acoustic pressure waves are coupled to the fiber cable.

As will be readily understood, fiber optic cables are widely deployed in both urban and rural areas and advantageously provide greater bandwidths, transmission distances, and reliability.

According to aspects of the present disclosure, mechanical vibrations resulting from raindrops striking a fiber optic sensor cable will affect scattering in the fiber and therefore be detected/analyzed by an operating DFOS/DAS interrogator. As such DFOS/DAS data is processed in real-time, advanced algorithms recognize unique signatures of each type of rain event along an entire length (route) of fiber optic sensor cable, enabling real-time rainfall intensity estimation and mapping.

Figure 2:
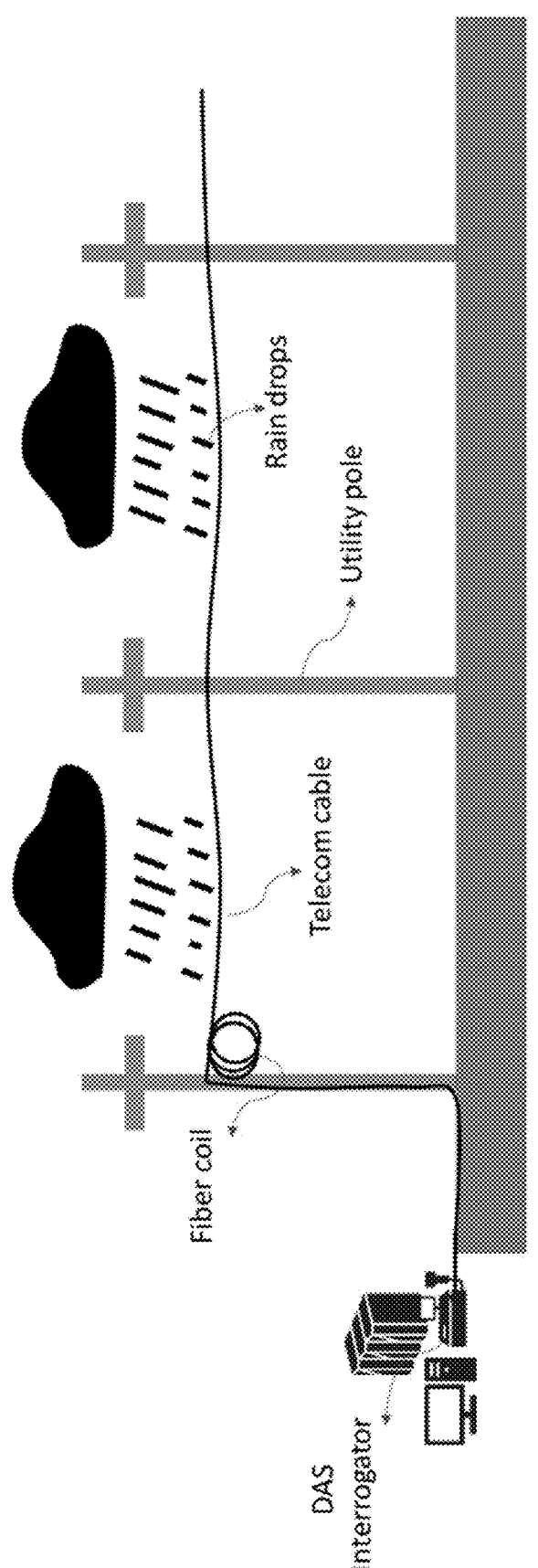
FIG. 2 is a schematic diagram illustrating rainfall intensity estimation using distributed acoustic sensing according to aspects of the present disclosure.

FIG. 2 is a schematic diagram illustrating rainfall intensity estimation using distributed acoustic sensing according to aspects of the present disclosure. As shown in that figure, a DFOS/DAS interrogator is shown in optical communication with a length of fiber optic sensor cable that may be an existing length of telecommunications cable suspended from utility poles. As shown further in the figure, such installations of fiber optic telecommunications cable may include one or more fiber coil loops likewise suspended from a utility pole.

Shown further in the figure is DFOS/DAS interrogator in optical communication with the fiber optic sensor cable (telecom cable) which—as we previously noted—is shown suspended from utility poles along its route. Storm clouds indicate rain, and as shown, falling rain drops contact the fiber optic sensor cable producing detectable acoustic vibrations that may be detected by operation of the DAS.

As will be apparent to those skilled in the art, our inventive DAS approach to rain intensity measurement uses real-time rain sounds and vibration data via DAS. Using this technology, an existing kilometer-long communications optical fiber can act as thousands of individual sensors without requiring external power, point sensors, nor a communication channel for data transfer or control. The observation of the rain intensity along the whole fiber route can be advantageously performed from one end of the fiber with extreme precision and sensitivity.

To estimate the rain intensity, an analyzer—which may be included in the interrogator—analyzes the frequency characteristics of rain sounds and vibration data obtained from the DAS using a Fourier transform. The maximum frequency and the cumulative relative frequency of the spectrum are determined—which serve as indicative features of rain intensity.

According to a Marshall-Palmer raindrop particle size distribution formula and Best equation:

$$N(D) = N_0 e^{-\alpha D},$$

$$\alpha(R) = 41 R^{-0.21}, \text{ and}$$

$$V_t(D) = A_0 \left[ 1 - \exp\left( \frac{-D^n}{\beta} \right) \right],$$

where N(D) is Marshall-Palmer distribution, R is rainfall intensity mm/h, D is the particle diameter of the raindrop, $V_t$ is the terminal velocity of water drops falling the atmosphere, $N_0$, $A_0$, $\beta$, n are constant parameters wherein their values are presented in Table 1.

TABLE 1

Parameters for Marshall-Palmer Raindrop Particle
Size Distribution and Best Equation

| Parameters | Value |
|---|---|
| $N_0$ | 0.08 $m^{-3} mm^{-1}$ |
| $A_0$ | 0.32 m/s |
| $\beta$ | 1.77 mm |
| n | 1.147 |

The Marshall-Palmer distribution relationship shown herein describes the number of raindrops with certain particle sizes. We can see that the number of raindrops present per unit volume increases as the rain intensity increases. Thus, the average landing time interval of the raindrop falling on the cable becomes shorter as rain intensity increases, and therefore, the frequency of the rain sounds becomes higher.

From a determined rainfall data our system may advantageously create graphical rainfall maps which show an amount of rain that has fallen over a given period (for example, 30 min or 1 h) at multiple locations along the length of the fiber optic sensor cable. By combining intensity data collected over all fiber routes, we can obtain maps of rainfall over an entire city/county/state/country.

Figure 3:
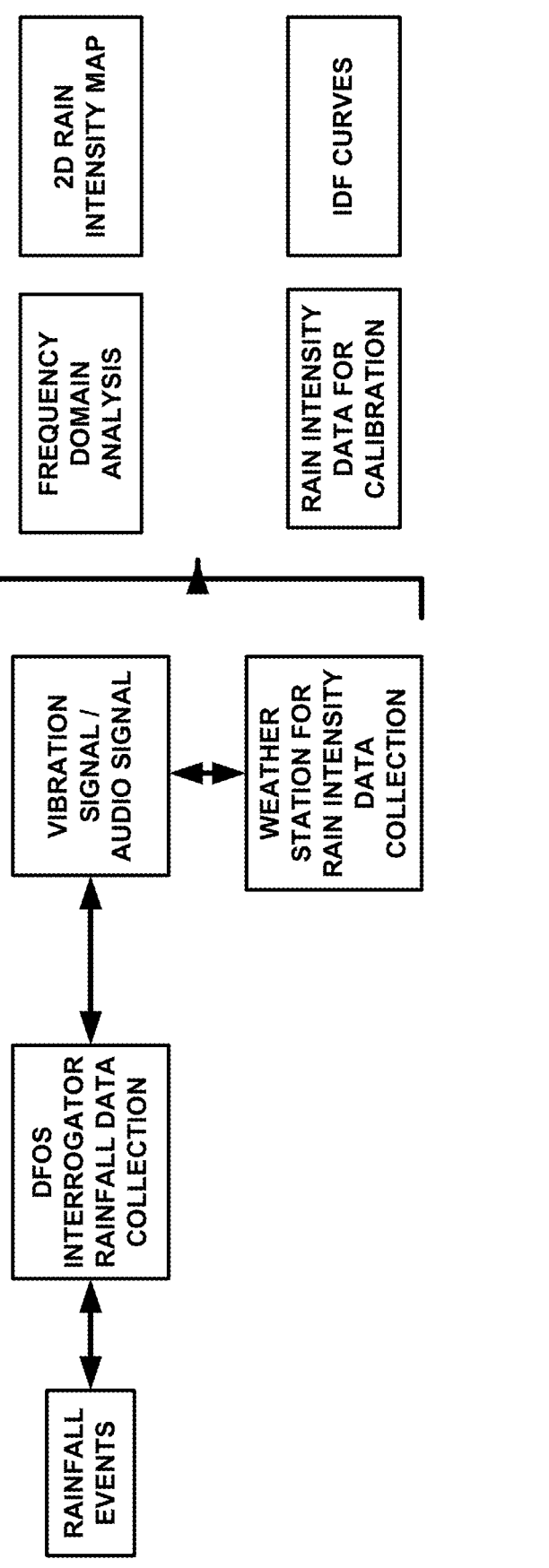
FIG. 3 is a schematic flow diagram illustrating operation of DFOS/DAS of a rainfall event according to aspects of the present disclosure.

FIG. 3 is a schematic flow diagram illustrating the operation of DFOS/DAS of a rainfall event according to aspects of the present disclosure. With reference to that figure we may now outline the overall rainfall intensity determination according to aspects of the present disclosure.

Step 1—Data Collection and Calibration

In this step, a DAS interrogator is provided and connected to a fiber optic sensor cable route. When operated during a raining period, real-time raindrop-induced vibration data is collected and processed in which filtering, normalization, and threshold processing is employed to denoise the raw signal. A physical rain gauge—mounted on a pole—may simultaneously collect the rain and generate intensity data to serve as as a calibrator. Advantageously, rain sound can be obtained from fiber sensor coils positioned at the utility poles, whereas vibration data can be obtained from a length of fiber optic sensor cable at user-specified spatial resolution.

Step 2—Frequency Domain Analysis
Maximum Frequency Value Analysis

The preprocessed data from DAS is used for feature extraction in the frequency domain. A moving average window is applied to the obtained frequency components to smooth the frequency characteristics. The maximum frequency at the maximum power spectrum value is calculated.

Based on the span between two poles, the fiber optic sensor cable is "divided" into several segments, and thus the maximum frequency can be averaged.

Based on the maximum frequency values of the rain sound or vibration, we can build a model to predict the rainfall intensity.

Relative Cumulative Frequency Analysis

In this step, the power spectrum of each frequency component is added up to calculate the cumulative frequency, while the rain intensity can be obtained from the shape of the curve representing the relative cumulative frequency. Similarly, based on the span between two poles, the cable can be divided into several segments, and thus the cumulative frequency can be averaged.

Determination of the correlation between cumulative frequency and rain intensity is made.

Step 3—Determination of the Category of Rain Intensities

Based on the classification guidelines of the rainfall category as published by the Meteorological Agency of Japan, the rain intensity can be classified into five categories as shown in Table 2.

First, the rain intensity can be roughly estimated based on the maximum frequency obtained in Step 2—Frequency Domain Analysis. Then the correlation between the cumulative frequency and the rain intensity can be used to refine the estimation within each category.

TABLE 2

Rain Intensity Category

| Category | Rain Intensity (mm/h) | Sound Effects | Maximum Frequency (Hz) |
|---|---|---|---|
| 1 | Rain (<1) | Drizzle | ≤4000 |
| 2 | Light rain (1-4) | Sprinkling | 4000-7000 |
| 3 | Moderate rain (4-8) | Evening shower | 7000-10000 |
| 4 | Strong rain (8-20) | Hard raining | 10000-20000 |
| 5 | Heavy rain (20-30) Fierce rain (30-50) | Pouring | 20000 or more |

Step 4—Determination of the Intensity-Duration-Frequency (IDF) Curves

The Intensity-Duration-Frequency (IDF) curves describe the relationship between rainfall intensity, rainfall duration, and return period, which are widely used in infrastructure design and water resources management. The main steps to derive the IDF curves are determined according to the following.

First, retrieve the extreme rainfall intensities for a given duration via annual maximum analysis.

Second, fit the extreme rainfall intensity time series for each duration to a theoretical distribution function such as the Generlised Extrem Value, Pearson III.

Third, calculate the rainfall intensity for each duration and return period based on the selected distribution function.

Fourth, construct the IDF curves based on the empirical equations such as Talbot, Sherman, Bernard via regression methods.

At this point, while we have presented this disclosure using some specific examples, those skilled in the art will recognize that our teachings are not so limited. Accordingly, this disclosure should only be limited by the scope of the claims attached hereto.

The invention claimed is:

1. A rainfall intensity estimation method operating in a distributed fiber optic sensing/distributed acoustic sensing (DFOS/DAS) system, the DFOS/DAS system comprising:

an optical sensor fiber;

a DFOS/DAS interrogator in optical communication with the optical sensor fiber, the DFOS/DAS interrogator configured to generate optical pulses, introduce the generated pulses into the optical sensor fiber, and receive backscattered signals from the optical sensor fiber; and an intelligent analyzer configured to analyze the backscattered signals received by the DFOS/DAS interrogator and determine from the backscattered signals, vibrational activity occurring at one or more points along the optical sensor fiber;

the rainfall intensity estimation method comprising operating the DFOS/DAS system and collecting backscattered signals including raindrop-induced vibration data from one or more points along a length of the optical sensor fiber over a period of time while determining rainfall intensity with a rain gauge; and by the intelligent analyzer;

associating the raindrop-induced vibration data from one or more points along the length of the optical sensor fiber with the rainfall intensity determined with the rain gauge and determining a rainfall intensity at the one or more points along the length of the fiber optic sensor cable from the raindrop-induced vibration data associated with the rainfall intensity determined with the rain gauge.

2. The method of claim 1 further comprising:

by the intelligent analyzer, calibrating the rainfall intensity by comparing the determined rainfall intensity with a rainfall intensity determination made from a rain gauge.

3. The method of claim 1 further comprising:

by the intelligent analyzer, performing a frequency domain analysis on the DFOS/DAS sensing data using a maximum frequency value analysis and determining a maximum frequency value of the raindrop-induced vibrational activity.

4. The method of claim 3 further comprising:

by the intelligent analyzer, constructing a predictive model of rainfall intensity from the determined maximum frequency value.

5. The method of claim 4 further comprising by the intelligent analyzer, performing a relative cumulative frequency analysis on each frequency component of the raindrop-induced vibrational activity which sums the power spectrum of each frequency component to generate a cumulative frequency and determining a correlation between the cumulative frequency and rainfall intensity.

6. The method of claim 5 further comprising by the intelligent analyzer, determining a category of rainfall intensity from the correlation between the cumulative frequency and rainfall intensity.

7. The method of claim 6 further comprising by the intelligent analyzer, determining an intensity-duration-frequency relationship which describes a relationship between rainfall intensity, rainfall duration and a return period.

8. The method of claim 1 further comprising by the intelligent analyzer, generating a map including location and rainfall intensity indicia.

9. The method of claim 1 wherein the optical sensor fiber includes one or more fiber loops along its length.

* * * * *